8554X
C. E. Potter.
Hackling Machine.
Patented Dec. 23, 1834.
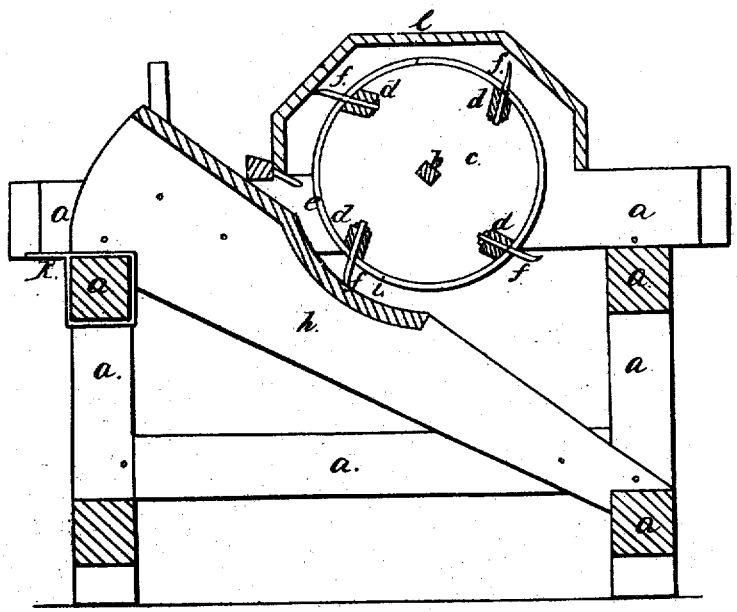
Section of the Machine.
THE ECKERT LITHOGRAPHING CO., WASHINGTON, D. C.

12/23/1834 8554 X
Dec. 23. 1834 371.

Chandler E. Potter, of Portsmouth New Hampshire

Letters Patent

The schedule referred to in these Letters Patent and making part of the same, containing a description in the words of the said Chandler E. Potter himself of his Improvement in a Machine for cleaning and dressing Manilla Hemp and other substances of a like nature.

To all to whom these presents shall come

Be it known that I, Chandler E. Potter of Portsmouth in the County of Rockingham, and State of New Hampshire, have invented a new and useful Improvement in cleaning & dressing Manilla, Hemp, and other substances of a like nature, and that the following is a full and exact description of the construction and operation of the said Machine, as invented or improved by me, ——

A frame is to be constructed of any suitable timber, the form will be square, having the posts about three feet high, and the length of the frame about six feet inside measure, for two persons to operate on the posts at each end are to be connected together by a cross piece on which at about one third of its length from the back is to be secured to each a box for the reception of the ends of a shaft of iron to revolve in it; this shaft forms the axis of a cylinder or hollow beater, to consist of a head secured at each end, from one to the other of which, extend bars of about six feet long, and may be four in number, and which are let into said heads and secured by means of an iron band, or hoop driven firmly on.

These heads may be about twenty inches in diameter, and the bars are to be armed with teeth or hooks of steel of about three inches long which are to be let into the wood by a square shank —

Drawing 312 8554X 12/23/1834 shank and the portion beyond or projecting must be brought to a point to be bent or curved on the operating edge, and straight on the back of the tooth, the point presented to the hemp is somewhat sharpened, or sufficiently so to make its way through, the remainder may be rounded into an oval form; they are to be set in the bars alternately, so that the teeth of the following will strike where there was a vacancy in the preceding bar, The hooked side of the tooth is to be presented to the hemp, but the hook is to be bent from it, or in the direction against the revolution of the cylinder, as the cylinder passes round it brings the teeth in contact with a cleaver or comb which consists of a bar the length of the frame set with teeth, at such an inclination downwards, and projecting towards the front that the teeth of the cylinder may pass between them, and consequently be cleared of any particles sticking to them, The teeth of this comb, may be straight, pointed, and somewhat flattened thinly presenting the edge to pass between those of the cylinder, They may be about twice the length of those in the cylinder —

In front of the cylinder is to be secured the hemp-form consisting of an inclined plane sloping down towards the interior of the frame and under the cylinder where when it comes in contact with the teeth of which it falls into a concave bed suited to the circumference of the cylinder & extends a short distance under it      Beneath this form or inclined plane, which extends the length of the machine, is to be secured to the bar under (which forms the top cross piece of the side of the frame) two handles or projections of iron set at right angles with the cross piece one for each operator, and are to pass round the bar so as to be moveable and additionally secure, The operation of the machine is thus conducted —

A hand or bundle of hemp is to be twisted at one end round the projecting handles under the inclined frame, and the other end thrown over the form or said inclined plane, till it comes in contact with the teeth when it is drawn under by them.

Through through the concave bed, and the operator let out portions at inter
vals, till the whole length has been subjected to the teeth, which is com
pleted by untwisting the end from the handle and passing that under
in the same manner, The comb at the back keeps the teeth clear
during the operation, a cover is adapted to the cylinder, for the pur
-pose of keeping in the flyings, and protecting the teeth from injury My Claim is for the combination and arrangement of my
machine as above described, and for the adaptation of the cy-
linder with its teeth, to the clearing and dressing Manilla,
hemp, and other substances of a like nature In testimony that the above is a full and exact
description of the construction and use, of my machine as inven
-ted or improved by me, I have hereunto set my hand this
eighth day of November eighteen hundred and thirty four, Witnesses
Henry Stone }
Robt. Clarke }

Chandler E. Potter, 948 w [illegible]

Exd
M.G.

Patented 23 Dec. 1834